(12) United States Patent
Craver

(10) Patent No.: US 9,538,851 B2
(45) Date of Patent: Jan. 10, 2017

(54) READY-TO-ASSEMBLE BED FOUNDATION

(76) Inventor: Larry James Craver, Winston Salem, NC (US)

(*) Notice: Subject to any disclaimer, the term of this patent is extended or adjusted under 35 U.S.C. 154(b) by 980 days.

(21) Appl. No.: 11/501,217

(22) Filed: Aug. 8, 2006

(65) Prior Publication Data

US 2008/0208709 A1    Aug. 28, 2008

(51) Int. Cl.
*A47C 19/02* (2006.01)
*A47C 19/00* (2006.01)
*G06Q 30/06* (2012.01)

(52) U.S. Cl.
CPC ........... *A47C 19/025* (2013.01); *A47C 19/005* (2013.01); *G06Q 30/0601* (2013.01); *G06Q 30/0633* (2013.01); *G06Q 30/0641* (2013.01)

(58) Field of Classification Search
CPC ............................ A47C 19/025; A47C 19/005
USPC ................ 5/201, 202, 200.1, 400, 401, 402, 310,5/285, 286, 236.1
See application file for complete search history.

(56) References Cited

U.S. PATENT DOCUMENTS

| | | | |
|---|---|---|---|
| 2,657,439 A | 11/1953 | Levine | |
| 3,754,289 A | 8/1973 | Larkin | |
| 3,842,451 A | 10/1974 | McCormick | 5/200 |
| 4,065,818 A | 1/1978 | Farina | |
| 4,074,372 A | 2/1978 | Schulz, Jr. | |
| 4,155,131 A | 5/1979 | Harris et al. | 5/296 |
| 4,181,991 A * | 1/1980 | Morgan et al. | 5/400 |
| 4,319,370 A | 3/1982 | Robinson | |
| 4,391,008 A | 7/1983 | Yamaoka et al. | |
| 4,535,494 A | 8/1985 | Diamonstein | 5/400 |
| 4,675,929 A | 6/1987 | Santo | 5/400 |
| 4,734,946 A | 4/1988 | Saputo | |
| 4,738,946 A | 4/1988 | Yamashita et al. | |
| 4,870,711 A | 10/1989 | Felix | 5/200 |
| 4,970,743 A | 11/1990 | Wride et al. | 5/451 |
| 4,998,310 A | 3/1991 | Olson | |
| 5,012,538 A * | 5/1991 | Timm | 5/200.1 |
| 5,144,706 A | 9/1992 | Walker | 5/400 |
| 5,469,589 A | 11/1995 | Steed et al. | 5/400 |
| 5,564,140 A | 10/1996 | Shoenhair et al. | 5/400 |
| 5,709,500 A * | 1/1998 | Mizelle et al. | 403/364 |
| 5,758,372 A | 6/1998 | Lopez Diaz | 5/200 |
| 6,058,535 A * | 5/2000 | Firkins et al. | 5/653 |
| 6,338,172 B1 | 1/2002 | Taylor et al. | |
| 6,832,397 B2 | 12/2004 | Gaboury et al. | 5/201 |
| 6,851,140 B2 | 2/2005 | Polevoy et al. | 5/200 |
| 7,003,822 B1 | 2/2006 | Sheehy | |
| 2002/0069462 A1 | 6/2002 | Gaboury et al. | 5/201 |
| 2003/0084509 A1 | 5/2003 | Harrow | 5/201 |
| 2004/0078896 A1 | 4/2004 | Hellyer et al. | 5/400 |
| 2004/0078897 A1 | 4/2004 | Gladney | 5/400 |
| 2004/0128761 A1 | 7/2004 | Gaboury et al. | 5/400 |
| 2005/0005357 A1 | 1/2005 | Van Raemdonck | 5/617 |
| 2005/0011005 A1 | 1/2005 | Borda | 5/412 |

(Continued)

OTHER PUBLICATIONS

Garme Colchones Catalog, undated, possible prior art.

*Primary Examiner* — David E Sosnowski
*Assistant Examiner* — Eric Kurilla

(57) ABSTRACT

A ready-to-assemble bed foundation including a pair of exterior beams connectable to a pair of transverse end members having openings, and an interior beam between the exterior beams having opposing end portions configured to engage the openings in the transverse end members. A method of selling a bed, and a method of assembling a bed are also disclosed.

9 Claims, 7 Drawing Sheets

(56) References Cited

U.S. PATENT DOCUMENTS

| | | | |
|---|---|---|---|
| 2005/0028274 A1 | 2/2005 | Hooper, Jr. | 5/400 |
| 2005/0028275 A1 | 2/2005 | Hooper, Jr. | 5/400 |
| 2005/0034233 A1 | 2/2005 | Gladney | 5/400 |
| 2005/0039258 A1 | 2/2005 | Gavela Vazquez | 5/400 |
| 2005/0039259 A1 | 2/2005 | Gladney | 5/400 |
| 2005/0091745 A1 | 5/2005 | Kong | 5/201 |
| 2005/0120478 A1 | 6/2005 | Hofmann | 5/400 |
| 2010/0170190 A1* | 7/2010 | Schulz, Jr. | 52/745.19 |

\* cited by examiner

READY-TO-ASSEMBLE BED FOUNDATION

BACKGROUND

The disclosure is directed to a ready-to-assemble bed foundation. More specifically, the bed foundation includes a pair of exterior side beams connectable to a pair of transverse end members having openings. The foundation also includes an interior beam between the side beams having opposing end portions configured to engage the openings in the transverse end members.

Ready-to-assemble bed foundations are known. Many are expensive and difficult to assemble, while others are of the type having a solid panel immediately below a mattress or box spring. These panels are often bulky or otherwise not suited to cost-effective shipping and storage. Other prior art foundations prevent access to the area below the mattress for storage, or do not provide for the addition of a slipcover. Thus, the prior art has not adequately addressed the need for a ready-to-assembly bed foundation that is economical to manufacture and easy to assemble, provides a comfortable yet stable support, permits access to a storage area under the bed, and provides for the addition of a slipcover.

SUMMARY OF THE DISCLOSURE

The disclosure is directed to a ready-to-assemble bed foundation having a pair of exterior side beams connectable to a pair of transverse end members having openings. The foundation also includes an interior beam having opposing end portions configured to engage the openings.

In this embodiment, the transverse end members, side beams, and interior beam of the foundation may include a pair of opposing longitudinal members coupled in spaced apart relation to a plurality of blocks. In addition, two of the blocks of the end members may be disposed in opposed relation to define an opening slightly larger than the opposing end portions of the interior beam.

The disclosure is further directed to an embodiment of a ready-to-assemble bed foundation including a pair of transverse end members; a pair of exterior side supports extending longitudinally from one of the transverse end members to the other, an interior support between the exterior side supports, and a plurality of spaced apart slats. Each of the slats has a surface defining a portion of the upper surface of the foundation and each is supported at opposing ends by the exterior supports and by the interior support between the opposing ends. The foundation of this embodiment also includes fasteners for coupling the slats at opposite ends to the exterior supports and permitting selective removal of the slats from the supports. The fasteners include a central stem and a plurality of flexible flanges surrounding the stem.

In this embodiment, the exterior side supports may include a plurality of slots for receiving the slats. Each slot is at least partially defined by a pair of opposing walls that are transversely oriented in relation to the longitudinal extension of the exterior side supports and a surface between the opposing walls substantially coplanar with a surface of the interior support for supporting. The surface includes an opening for receiving the fasteners, such that the slats are coupled at opposing ends to the exterior supports.

Another embodiment of a ready-to-assemble bed foundation is disclosed including an upper surface at least partially defined by generally coplanar tops of interchangeable slats. The slats are positioned to provide openings in the top of the foundation. Each of the slats is supported at both ends by one of a series of beams including a interior beam in floating engagement at each opposing end with one of a pair of transverse foundation end members.

A method of selling beds is disclosed including in an embodiment, selling a collapsed mattress, selling a disassembled foundation, and permitting a customer to carry the collapsed mattress and disassembled foundation to a car for transport to a residence for assembly of the foundation and uncollapsing of the mattress.

A method of assembling a bed is also disclosed. In an embodiment the method includes assembling a foundation by placing each of a pair of opposing ends of an interior support into an opening in one of a pair of a transverse end members, connecting a pair of exterior side beams to the transverse end members, and placing a plurality of slats into slots formed in the exterior side beams. The method may also include placing a slipcover on the foundation, uncollapsing a mattress and placing the mattress on the foundation.

These and other embodiments of the foundation will become apparent to those skilled in the art after a reading of the following description of the preferred embodiment when considered with the drawings.

DESCRIPTION OF THE VARIOUS EMBODIMENTS

The illustrations and descriptions thereof are for the purpose of describing embodiments of a bed foundation, and are not intended to limit the invention to any particular embodiment shown or described. Those of ordinary skill will recognize that the foundation described by the appended claims is subject to numerous embodiments.

Figure 1:
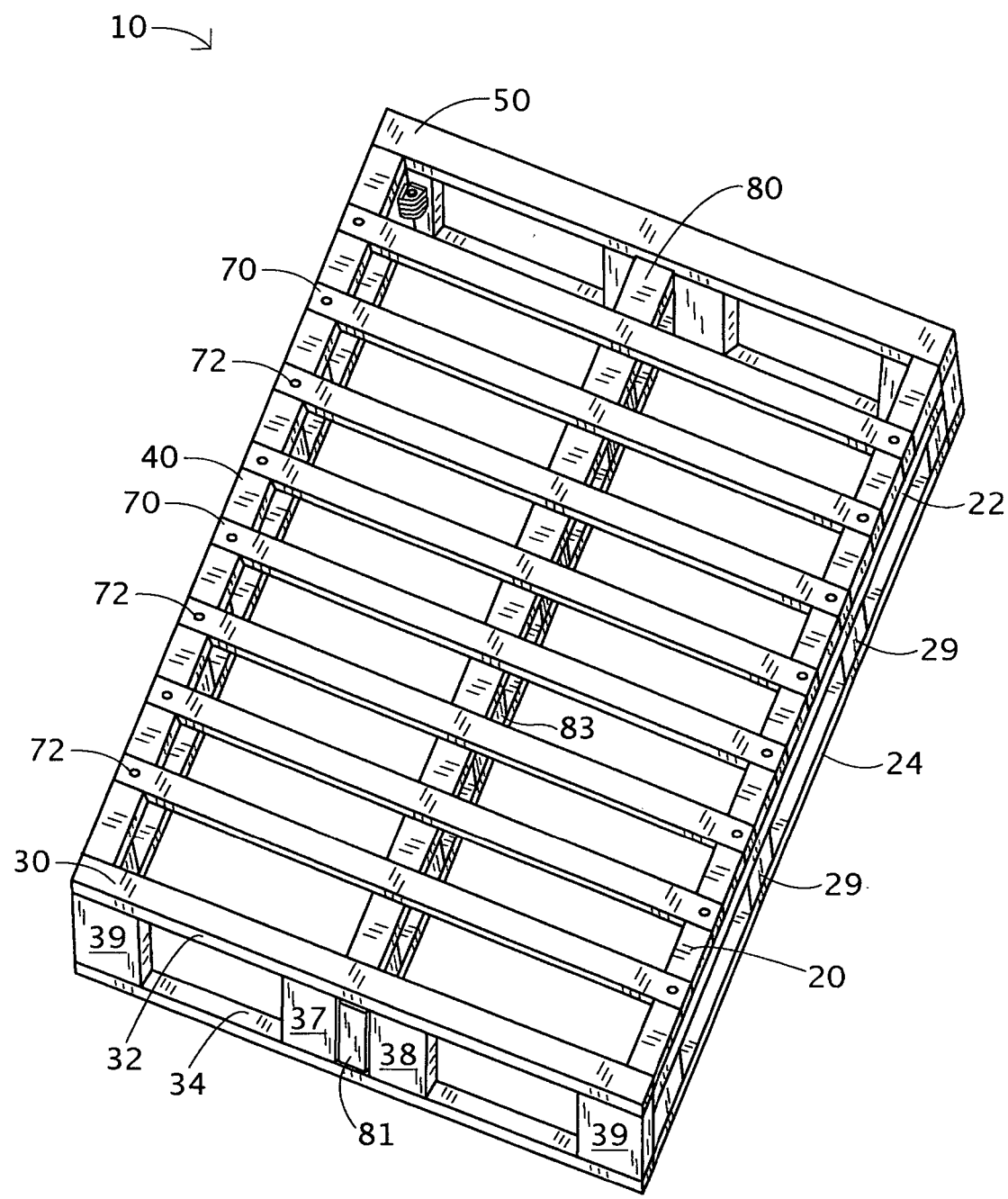
FIG. 1 is a top perspective view of an embodiment of a ready-to-assemble foundation for a bed, as already assembled from kit form.

FIG. 1 shows a foundation 10 for a platform bed. The foundation 10 includes a pair of exterior side beams 20 and 40 extending longitudinally between a pair of transverse end members 30 and 50 to form a generally rectangular outer frame. An interior support beam 80 may optionally be centrally located between the beams 20 and 40. Each of a plurality of flexible, spaced apart slats 70 extends longitudinally from one of the exterior side beams 20 or 40 to the interior beam 80 and has a top surface generally coplanar with the top surface of the frame.

The exterior side beam 20 is substantially identical to the beam 40 and includes an upper 22 and lower member 24 spaced vertically by a plurality of blocks 29 between the members 22 and 24. The upper member 22 includes a plurality of spaced apart slots for receiving the slats 70 to provide with ends of the slats 70 a generally planar top surface.

The transverse end member 30 is substantially identical to the member 50 and includes a pair of longitudinal members 32 and 34 spaced vertically by a plurality of blocks 37, 38 and 39. The blocks 37 and 38 are spaced to provide an opening sized and positioned for easily receiving an end portion 81 of the interior beam 80. In the embodiment of the foundation 10 shown in FIG. 1, the opening between the blocks 37 and 38 is slightly larger than the end portion 81, which allows the end portion 81 to float within the opening. This allows the interior beam 80 to move slightly while being retained. Such movement provides "give" when an occupant of the bed moves.

Figure 2:
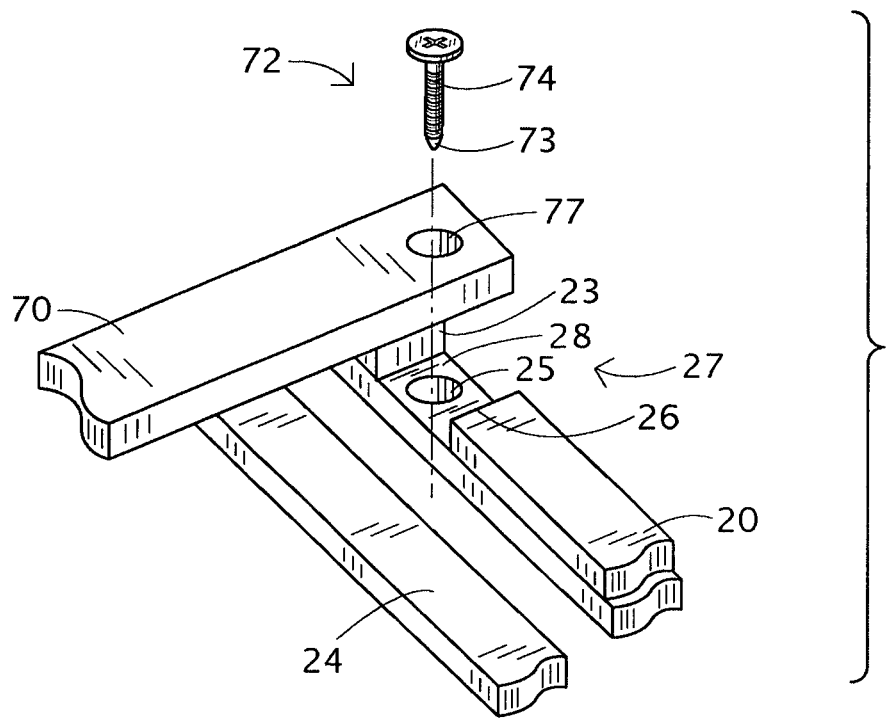
FIG. 2 is an enlarged top perspective view of fastening system for joining slats to the foundation.

FIG. 2 shows a fastener 72 for repeatedly coupling to and removing the slat 70 from the exterior side member 20, which includes slots such as the slot 27 defined by opposing walls 23 and 26 and a substantially horizontal surface 28 between the walls 23 and 26. The slat 70 includes an opening 77 and the surface 28 includes an opening 25 for receiving a fastener 72 stem 73 surrounded by a flexible flanges 74. The openings 77 and 25 are sized to provide engagement between the slat 70 and the beam 20 that remains intact during ordinary use of the foundation yet without the need for special tools permits removal of the slat 70 for storage or transportation of the foundation. Each slat 70 includes an opening at its opposite end like the opening 77 for receiving an additional fastener 72 and the beam 40 shown in FIG. 1 includes openings such as the opening 77.

Figure 3:
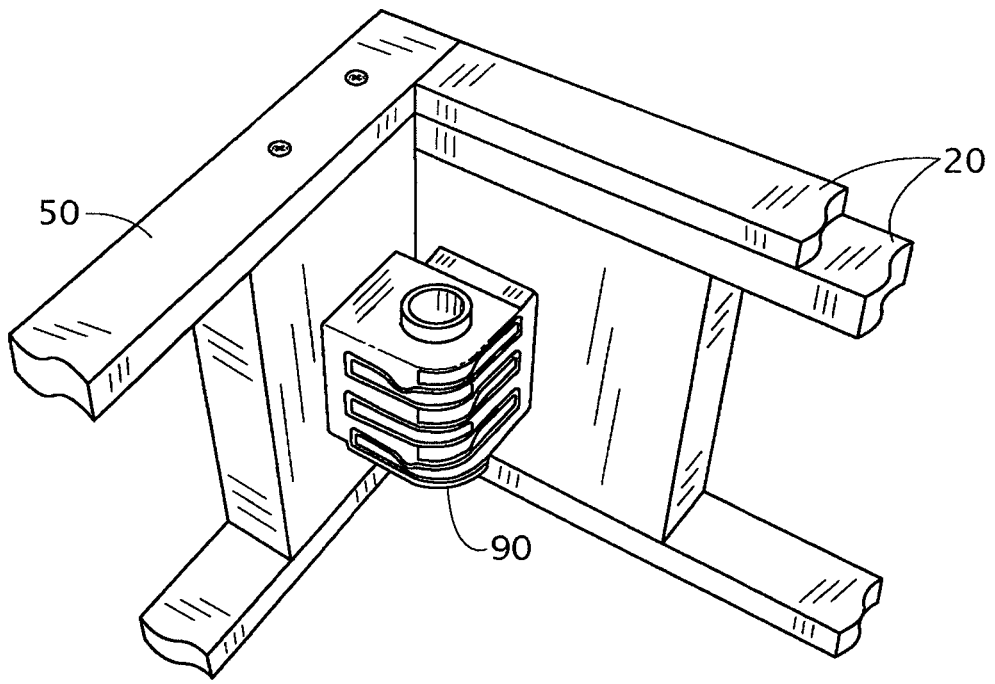
FIG. 3 is a top perspective view of the inside of a corner of an embodiment of the ready-to-assemble foundation.

FIG. 3 shows an inside corner of the foundation 10 including a connector 90, which is disclosed in U.S. Pat. No. 5,709,500, issued to Mizelle, incorporated herein in its entirety. The exterior beam 20 is coupled to the transverse end members 30 with the connector 90. This structure is replicated at the other corners of the outer frame of the foundation 10. In the Mizelle connector, the tapered pins join bases that have interleaved tongues with a conical bore in which the pins can fit. In another design not covered in the Mizelle patent, the taper of the connecting pin and the bores in the base units have been eliminated. The bores are all of the same diameter and the diameter of each bore is constant, rather than having a truncated conical shape. The pin has a substantially constant diameter along its length except for a series of outwardly protruding peripheral ridges or ribs. These outward protruding ribs frictionally engage the inside wall of the constant-cross section bores to hold the pins in place.

Figure 4:
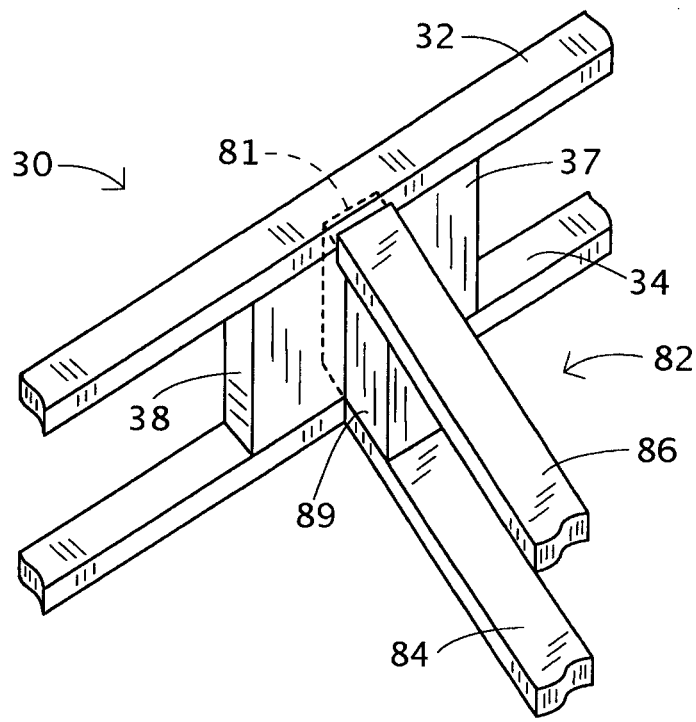
FIG. 4 is a top perspective view of a joint between an interior beam and a transverse end member of an embodiment of a ready-to-assemble foundation for a bed.

FIG. 4 is an end of the interior beam 80, which also includes an upper 82 and lower member 84 spaced vertically by a plurality of blocks such as the blocks 83 (shown in FIG. 1) and 89. The upper member 82 includes a generally horizontal planar surface 86 for supporting the slats 70 without the need for fastening the slats 70 to the surface 86. The beam 80 includes two opposing end portions, such as the end portion 81 shown, which is configured extend into the opening between the blocks 37 and 38 of the transverse end member 30 when the foundation is assembled.

Figure 5:
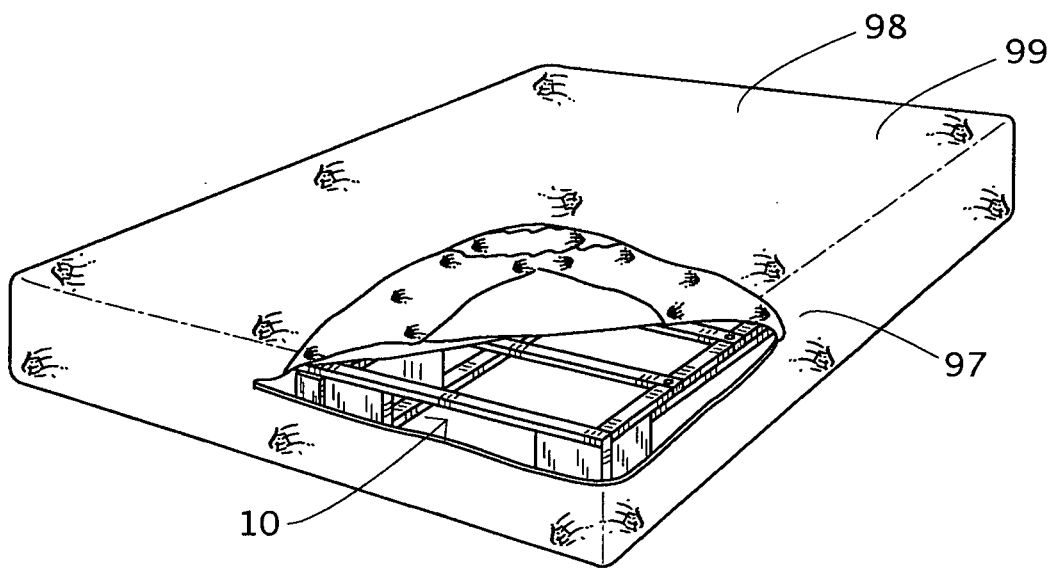
FIG. 5 is a top perspective view of a slipcover on the ready-to-assemble bed foundation.

FIG. 5 shows the foundation 10 with a slipcover 98 over the generally rectangular frame of the foundation 10. The slipcover 98 may optionally include an integrally formed padding 99 for placement above the foundation and a zipper seam 97 to facilitate installation of the foundation 10 in the slipcover 98.

Figure 6:
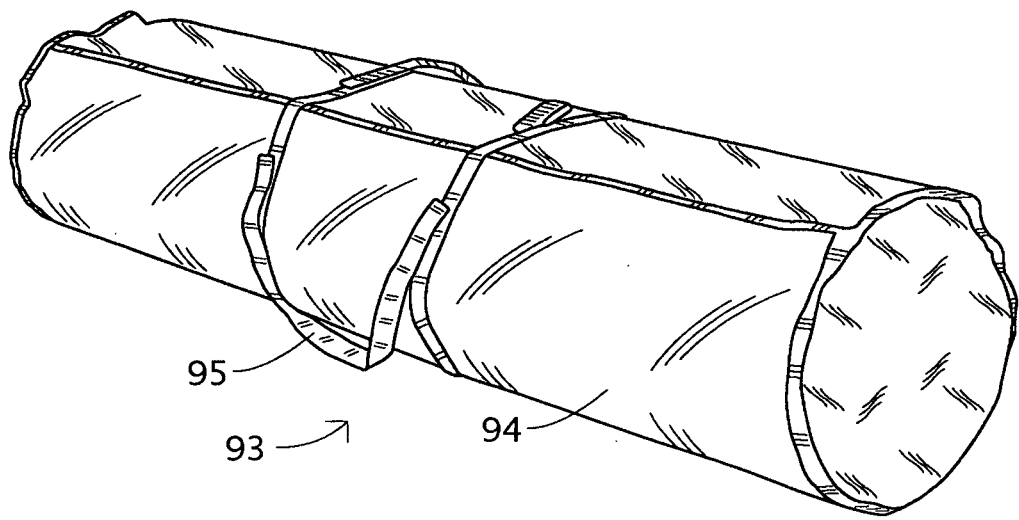
FIG. 6 is a top perspective view of a mattress suitable for use with embodiments of the foundation in a mattress container.

FIG. 6 shows a mattress 94 in a collapsed configuration. The mattress 94 shown is vacuum packed into a handy transparent shipping and carrying bag 93 including handles 95. The disassembled foundation 10 can likewise be packaged in a carton, with or without carrying handles, or bag such as the bag 93 shown. The bag 93 provides a convenient container for carrying the mattress 94 and/or bed foundation 10 from a store to a vehicle, and further for transport from the vehicle into a residence for assembly. Alternatively, the mattress 94 can be sold to a customer from a catalogue or internet site shipped in this configuration. Such collapsed mattresses are known and are available from Garme Colchones, Poligone Industrial Norte, c/Barranco, serial number 46469, Beniparrell Valencia Spain or Garme USA, Inc. 1914 Aleghany Street, Suite 101, High Point, N.C. 27263.

Figure 7:
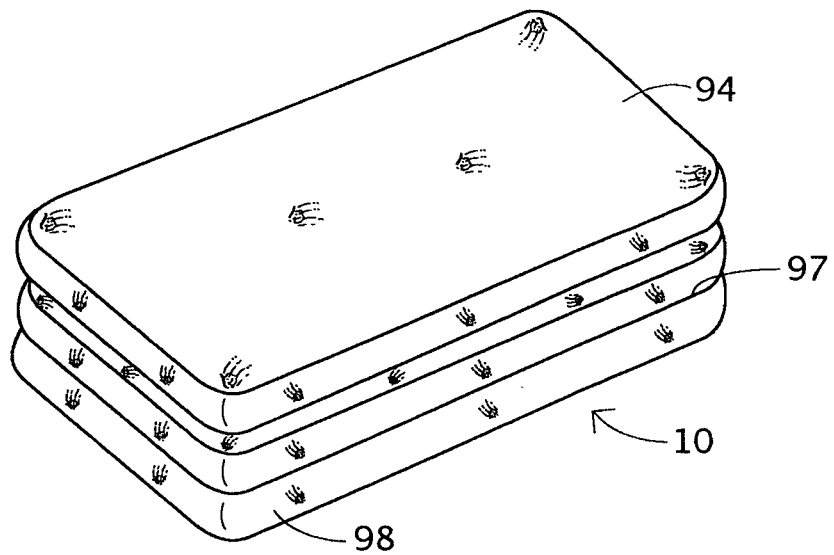
FIG. 7 is a top perspective view of an embodiment of a bed foundation having an optional slipcover and a mattress atop the foundation and slipcover.

FIG. 7 shows the mattress 94 in an uncollapsed configuration atop the foundation 10 and optional slipcover 98. A consumer can convert the mattress to the uncollapsed configuration shown after transport to a residence by simply removing the mattress 94 from the bag 93 shown in FIG. 5, unrolling it and allowing it to allow the mattress to expand.

The bed foundation can be provided in various sizes including but not limited to twin, double, queen, king and California king.

Figure 8:
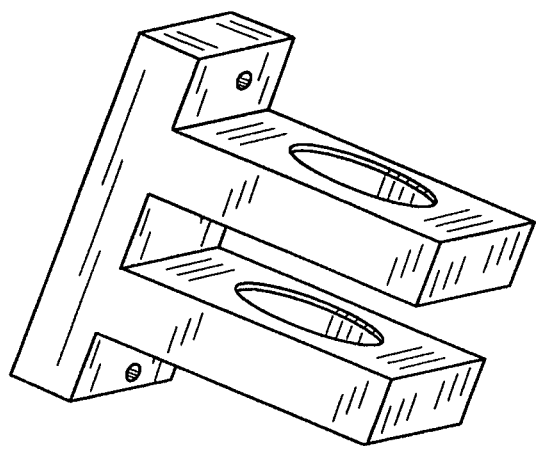
FIGS. 8 and 9 are views of alternate corner connectors, used together with a novel connecting pin shown in FIG. 10 (not to scale).
Figure 9:
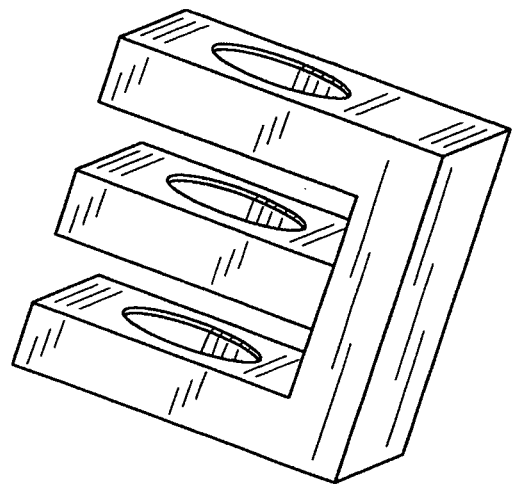
Figure 10:
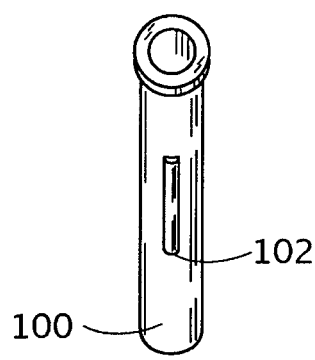

The connectors of U.S. Pat. No. 5,709,500, discussed above have a series of holes that taper in diameter and the pin used with them has a taper, the tapers being used to lock the connector together. FIGS. 8 and 9 show an alternate connector design in which the taper of the holes is not needed. The holes formed can have equal sizes. FIG. 10 shows a pin 100 having a straight, uniform shaft and an axial ridge or protuberance 102 to engage the insides of the holes and frictionally engage the connector blocks.

Figure 11:
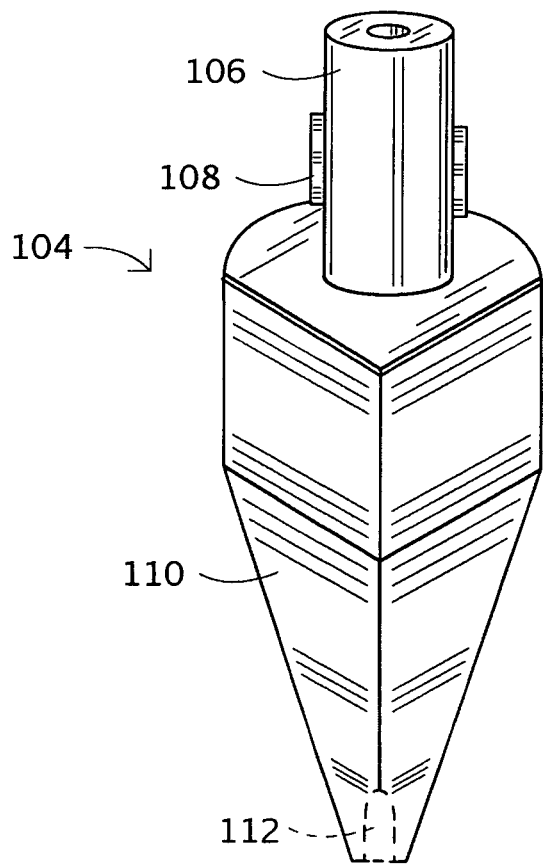
FIG. 11 is a perspective view of a combined foot and connecting pin.

FIG. 11 shows a combined pin and bed foot 104, enabling the use of the foundation without a bed frame. The combined pin and foot 104 includes a pin 106 having a straight, uniform shaft and an axial ridge or protuberance 108 to engage the insides of the holes and frictionally engage the connector blocks. This design works well with the connectors of FIGS. 8 and 9. The foot portion 110 extends down below the connector toward the floor. It can make contact with the floor, or more preferably, a glide or caster (not shown) is inserted in a hole 112 at the bottom of the foot 110. Thus, the side beams and transverse end members have connectors adjacent ends thereof, the connectors including flanges that can be interleaved with aligned openings through the interleaved flanges, and pins extend through the aligned openings having lower extensions forming feet for the foundation to rest on a floor. A combined foot and pin to be used with the connectors of U.S. Pat. No. 5,709,500 can also be considered, but would need to have the connectors installed upside down and then have the pin configured so its diameter diminishes from the lower to the upper part of the pin with the foot attached to the bottom of the pin. Such a design is within the scope of this invention, although not preferred.

Figure 12:
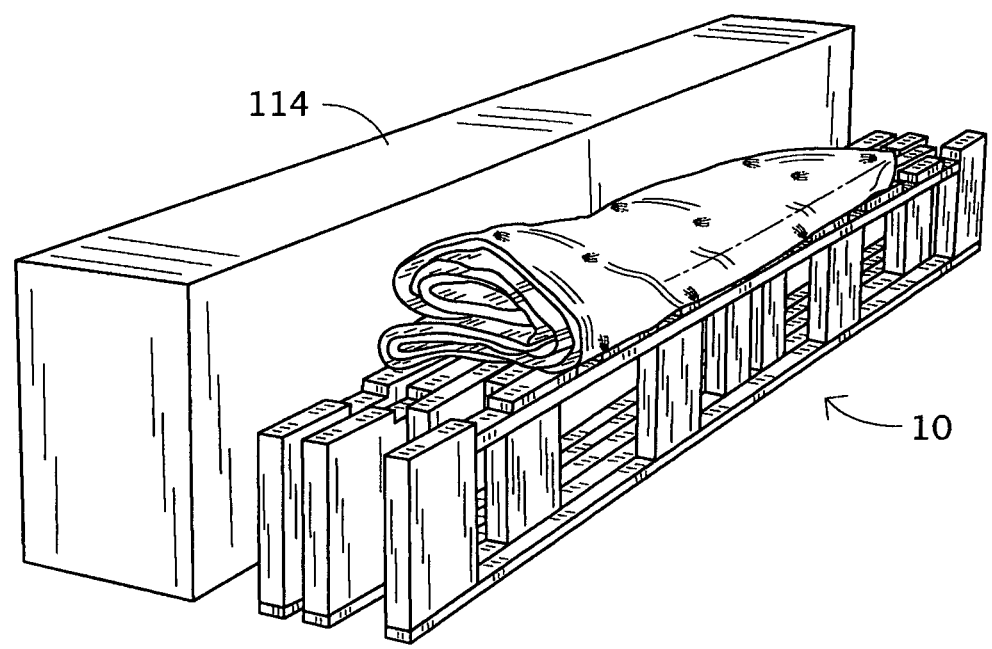
FIG. 12 is a perspective view of the ready to assemble foundation with slip cover adjacent a shipping carton sized and configured to receive the ready to assemble foundation with slip cover.

FIG. 12 shows the foundation unassembled, with the slipcover 98 folded on top. As can be seen, these collapsed subcomponents can fit into a carton 114 for easy shipping and storage.

Figure 13:
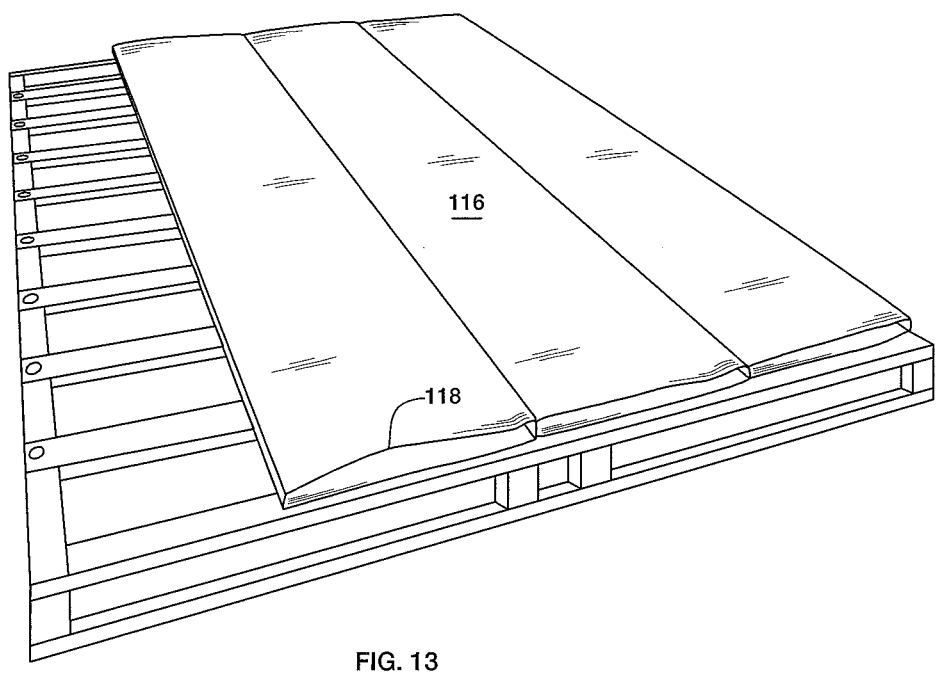
FIG. 13 is a perspective view of an assembled foundation with an optional deployable mat.

FIG. 13 shows a partially unfolded platform 116 that can optionally be used with the foundation 10. The platform 116 is made of fabric to cover the foundation area and has a plurality of longitudinal pockets 118 into which cardboard panels can be inserted. These panels in the pockets provide stiffness for the flat platform over the spanned slats. In a preferred embodiment, the cardboard and its receiving pockets are ten inches wide, so that six pockets and panels can be used for a queen size foundation; four can be used for a twin size.

Certain modifications and improvements will occur to those skilled in the art upon a reading of the foregoing description. All such modifications and improvements have not been included herein but may properly fall within the scope of the appended claims.

The invention may also be characterized thusly:

A. A method of selling beds comprising
  selling a collapsed mattress that can be carried by an adult customer by him or herself,
  selling a disassembled foundation having longitudinal parts and cross members to retain the longitudinal parts in an assembly in its disassembled state that can be carried by an adult customer by him or herself,
  permitting a customer to carry the collapsed mattress and disassembled foundation to a car for transport to a residence for assembly of the foundation and uncollapsing of the mattress.

B. A method of assembling a bed foundation comprising
  placing each of a pair of opposing ends of an interior beam into an opening in one of a pair of a transverse end members,
  connecting a pair of exterior side beams to the transverse end members, and
  placing a plurality of slats into each of a pair of slat tracks so the slats span from the exterior side beams to the interior beam.

C. The method according to Paragraph B further comprising placing a slipcover on the foundation.

D. The method according to Paragraph B further comprising uncollapsing a mattress and placing the uncollapse mattress on the foundation.

E. The method of Paragraph B, wherein connecting includes interleaving connector loops that are attached to the exterior side beams and the transverse end members and inserting a pin into the interleaved loops to retain them together.

F. A ready-to-assemble bed foundation comprising:
  a pair of exterior side beams having two ends with connectors at each end that include parallel, spaced-apart tongues rigidly supported on a base plate,
  a pair of transverse end members each having two ends with connectors at each end that include parallel spaced-apart tongues rigidly supported on a base plate and each having a medial opening between its ends,
  pins for insertion through interleaved ones of the connectors attached to one end of one side beam and one end of a transverse member, and
  an interior beam including end portions configured to extend into the medial openings in the transverse end members,
  whereby the side beams and end members can be assembled into a quadrilateral shape with the interior beam extending between the transverse ends and the pins can be inserted in interleaved ones of the connectors at corners of the quadrilateral shape to maintain the shape with the interior beam held in position between the transverse ends.

G. A method of selling beds comprising:
  offering a collapsed mattress and disassembled foundation to purchasers through an offering medium selected from the group of consisting of a catalog, an internet website, a telephone solicitation, and a physical store;
  accepting an order from a purchaser for the collapsed mattress and disassembled foundation; and
  shipping the collapsed mattress and disassembled foundation to the purchaser for assembly of the foundation and uncollasping of the mattress.

I claim:

1. A ready-to-assemble bed foundation comprising:
  a pair of exterior side beams, each of said pair of exterior side beams including an upper member and a lower member spaced apart by blocks such that each side beam defines an outer vertical wall of an assembled foundation,
  a pair of transverse end members having openings, each of the transverse end members including a pair of opposing longitudinal members coupled in spaced apart relation to a plurality of blocks, and
  an interior beam comprising opposing end portions configured to extend into and be retained by the openings in the transverse end members,
  wherein two of the blocks in the transverse end members define one of the openings, which is substantially the same size as the end portions to both receive and retain the interior beam end portions relative to the transverse end members, but to permit give between the interior beam end portions and the transverse end members in response to movement by an occupant.

2. The ready-to-assemble bed foundation according to claim 1 wherein the interior beam further comprises a pair of opposing longitudinal members coupled in spaced apart relation to a plurality of blocks.

3. The ready-to-assemble bed foundation according to claim 1 further comprising slats that can be installed to span from the exterior side beams to the interior beam.

4. The ready-to-assemble bed foundation according to claim 3 wherein the slats and exterior side beams have aligned holes and further comprising molded plastic fasteners to pass through aligned holes in a slat and one of the exterior side beams to fasten the slats to the exterior side beams, wherein the fasteners are selected from the group consisting of Christmas tree fasteners and fasteners having longitudinal ribs.

5. The ready-to-assemble bed foundation according to claim 1 further comprising a platform to cover the foundation area including a fabric item having longitudinal pockets and cardboard panels inserted in the pockets.

6. A ready-to-assemble bed foundation as claimed in claim 1 further comprising connectors wherein the side beams and transverse end members have connectors adjacent ends thereof, the connectors including flanges that can be interleaved with aligned openings through the interleaved flanges, and pins to extend through the aligned openings having lower extensions forming feet for the foundation to rest on a floor.

7. A ready-to-assemble bed foundation as claimed in claim 1 wherein the foundation has an area further comprising a platform to cover the foundation area, the platform having a plurality of longitudinal fabric pockets receiving rigid panels to provide stiffness for the flat platform.

8. The A ready-to-assemble bed foundation of claim 1 wherein the blocks in the exterior side beams and the transverse end members comprise blocks at opposite ends and in addition to at least one block intermediate the opposite ends of the exterior side beams and the transverse end members.

9. A ready-to-assemble bed foundation in kit form comprising in unassembled condition:
   a pair of preassembled side beams having two ends with connectors at each end, each connector including parallel, spaced-apart tongues rigidly supported on a base plate,
   a pair of preassembled transverse end members each having two ends with connectors at each end, each connector including parallel spaced-apart tongues rigidly supported on a base plate and each transverse end member having a medial opening between its ends,
   the tongues of the connectors of the side beams and transverse end members sized and arranged to enable tongues of the side beams to be interleaved with tongues of the transverse end members and provide aligned openings through the interleaved tongues,
   pins for insertion through the aligned openings of interleaved ones of the tongues of the connectors attached to one end of one side beam and one end of a transverse end member,
   a preassembled interior beam including end portions configured to extend into the medial openings in the transverse end members of the same size as the end portions to both receive and retain the interior beam end portions relative to the transverse end members, but to permit give between the interior beam end portions and the transverse end members in response to movement by an occupant, and
   a plurality of slats long enough to span at least the distance from the exterior side beams to the interior beam,
   whereby, during assembly of the bed foundation the unassembled side beams and transverse end members can be assembled into a quadrilateral prismatic shape with the interior beam extending between the transverse end members and the pins can be inserted in interleaved ones of the tongues at corners of the quadrilateral shape to maintain the shape, with the interior beam in position between the transverse ends and at least the distance from the exterior side beams to the interior beam can be spanned by the slats.

* * * * *